March 14, 1967 G. B. E. SCHUELER 3,309,444
METHOD OF PRODUCING PARTICLE BOARD
Filed May 31, 1963
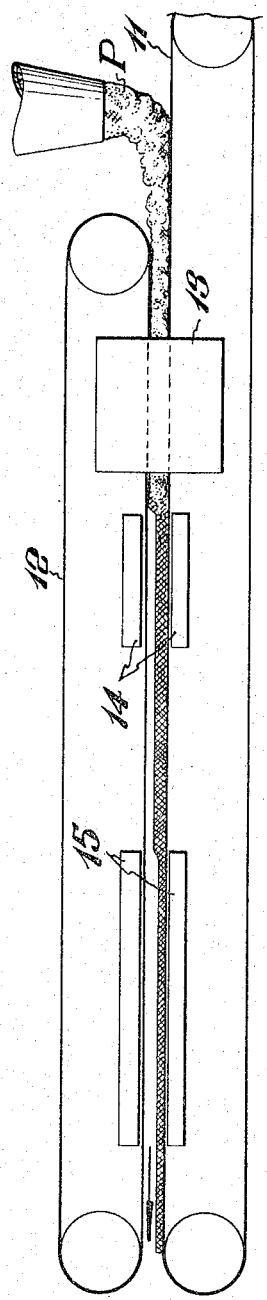
INVENTOR:
G. B. E. SCHUELER
BY: Lieber & Nilles
ATTYS United States Patent Office 3,309,444
Patented Mar. 14, 1967

3,309,444
METHOD OF PRODUCING PARTICLE BOARD
George Berthold Edward Schueler, The Old College,
Tideswell, near Buxton, England
Filed May 31, 1963, Ser. No. 284,698
Claims priority, application Great Britain, June 7, 1962,
22,036/62
10 Claims. (Cl. 264—109)

This invention concerns the utilisation of wood waste and other fibrous materials, or mixtures thereof, in the manufacture of board, or shaped moulded articles, of a substantially rigid nature.

The general object of the invention is to facilitate improved utilisation of such fibrous materials for the purposes stated by the provision of preparations of materials (e.g. fibrous moulding materials) and improved processes of manufacture (e.g. continuous processes for the manufacture of board).

More specific objects are, to eliminate, in the production of continuous particle board, the use of heavy and expensive machinery; to make possible the moulding of rigid thermoset mouldings having a low resin content from a dry fibrous mix; to make possible the production of mouldings of low or high density, high definition, good dimensional stability, and smooth finish from comparatively coarse fibrous materials, and to facilitate the control of the physical and chemical properties of such mouldings according to the desired end-use; and to make available a range of fibrous moulding materials whose processing characteristics can be readily adjusted according to the manufacturing equipment available.

According to the present invention a preparation of substantially dry materials from which products of a substantially rigid nature may be made by the application of heat and pressure consists of a major proportion of coarse fibrous material in divided form, and, dispersed throughout the mass of said fibrous material, firstly, thermoplastic material of such a nature and in such amount as will enable the fibrous material to flow on the application of heat, and, secondly, thermosetting material, capable of being cured by the application of heat whereby to give the products rigidity.

As fibrous material, wood in one form or another is preferred, although the use of other fibrous materials, such as reeds, vegetable stems, and cork, either alone, or in combination with each other or with wood is not excluded.

For the production of board the fibrous material may usefully consist of a basis of shavings and chips of substantial length (e.g. of the order of quarter of an inch or more) together with an additive of finer wood waste such as sawdust at least half of which consists of particles having sizes lying within the range 5 to 40 mesh (i.e. will pass through mesh sizes ranging from 25 to 1600 apertures per square inch).

When the preparation is for moulding purposes the fibrous material may usefully consist of wood waste of particle size 10 mesh or finer.

As useful thermoplastic materials may be mentioned the following: polypropylene, polymethyl methacrylate, ethyl cellulose, cellulose acetate, cellulose propionate, cellulose acetate butyrate, cellulose nitrate, polyethylene, polystyrene, acrylonitrile-butadiene-styrene terpolymers and blends, acrylonitrile-styrene copolymer, polyvinyl acetate, polyvinyl chloride, polyvinyl chloride-acetate copolymers, coumarone resins, shellac, styrene-butadiene copolymers, chlorinated polyphenyls, bitumen; and as useful thermosetting materials, the following resins: phenol-formaldehyde, phenol-furfural, melamine-formaldehyde, urea-formaldehyde, polyacrylic ester, polyester, epoxy, diallyl phthalate, furan, of those phenol-formaldehyde, melamine-formaldehyde and urea-formaldehyde being preferred.

The melting point of the thermoplastic component of the preparation will usually be lower than the temperature which causes a rapid curing of the thermosetting component, which latter component is thus enabled substantially to stabilise the dimensions of the product until cooling and solidifying of the thermoplastic component is complete, but the use of a thermoplastic component which has a melting temperature higher than this temperature is not excluded, and in fact is desirable in cases where curing must be complete upon cooling, for example when continuously producing particle board in the manner described hereinafter.

The precise proportions of the three components of the preparation will depend on circumstances, for instance the characteristics required in the final product, but the percentage of fibrous material will, by dry weight, usually amount to about 75, with usually not less than 5% of the thermoplastic material. The percentage of thermosetting resin may often be quite small, even less than 1% in some cases. The use of additives to give special characteristics is envisaged. For example colouring media, and agents to assist in achieving weather-proofing may be used. When curing of the thermosetting material is to be completed after an article has been formed from the preparation, a curing catalyst may be added before or after use.

In final form ready for use the preparation will, for many applications, preferably consist of particles (apart from any long fibres present which should be well layered or randomised) whose sizes (in the case of a fibrous moulding material) lie within the range 8 to 150 mesh, but with between 80% and 90% of the particles lying within the range 10 to 60 mesh, or (in the case of a preparation for the manufacture of board) lie within the range 5 to 30 mesh. The moisture content of the preparation will be low, preferably of the order of 5% by weight, so that when being used as later described excessive moisture is not present to delay the setting of the thermoplastic material or give rise to such an amount of steam as would disturb the bonding process whilst the material was still in plastic state.

The invention lends itself to the utilisation of waste materials for both the thermoplastic component and the thermosetting component. As examples of the former may be mentioned stick shellac and lignin, and of the latter, contaminated or low-grade resins. Since the greater proportion of the preparation is fibrous waste in any case, the contamination present will not usually interfere in any way with the satisfactory use of preparation containing such waste materials. Thus, compared with processes using conventional preparations, processes using preparations according to the invention and containing such waste materials, will be economically more attractive.

The invention also includes within its scope a number of methods of producing such preparations.

According to one such method a suspension of the thermoplastic and thermosetting resins is prepared and then mixed into wood waste in divided form the mixture being then dried to the desired moisture content and ground to the desired particle size. The heat generated by the grinding process is such as to cause the thermoplastic resin or resins to become slightly tacky and this assists in attaching at least the thermoplastic resin particles thereof to the fibres. This action is of importance in producing a stably homogeneous material.

According to another such method divided wood waste is impregnated with water and/or a water proofing agent and a powdered mix of the thermoplastic and thermosetting resins is dusted onto the damp fibrous material, which is then heat-dried. The drying temperature is such as to cause the thermoplastic resin or resins to melt and adhere the thermosetting material firmly to the fibrous material. The thermosetting resin may, of course, in an alternative method, be added separately, and in either event the wetting of the fibres may be omitted, the heat being applied solely for the purpose of melting the thermoplastic resin.

Naturally these methods should only be applied when the thermosetting resin is such as will not be cured, or at least not to any undesirable extent, at the temperatures involved.

Thus, it will be appreciated that the preparation may be produced in different ways and with known equipment, but it is very advantageous to cause, at some stage, the thermoplastic material to become tacky or to melt so as to assist in the permanent and even dispersion of itself and the thermosetting material throughout the mass of fibrous material. The thermoplastic material may be introduced to the mix as a dry powder, an emulsion, or even in solution. Furthermore resins may be introduced in only partly polymerised state, either as a liquid or a solid, provided that at an appropriate stage during the conversion of the preparation into an article of manufacture the conditions are such that polymerisation will be continued to the degree desired.

The invention also comprises methods for producing articles of manufacture from the preparations hereinbefore described.

The general method according to the invention comprises the steps of shaping a quantity of the preparation to its desired form whilst being first heated and then cooled, the heat being applied so that some curing of the thermosetting material takes place at least at the surface regions of the articles before solidification of the thermoplastic material commences. It will usually be very desirable that the thermoplastic material will be heated to a state in which it will flow readily under modest pressure before any substantial degree of curing of the thermosetting material has taken place.

The ability of the thermoplastic resins which we prefer to use to flow when heated to their melting point and the relatively rapid solidification thereof on cooling, are the reasons for some of the more important advantages of the invention. The quick solidification enables board or moulded articles to be produced rapidly, whilst the flow enables complicated shapes to be readily achieved. For example mouldings of some complexity of shape can be made with a high surface finish even though the fibrous material is coarse (e.g. of the order of 10 mesh particle size). The thermosetting component, even if only cured or set by the heat of the process at the shaped surfaces, prevents the resilience of the fibres causing distortion during the moulding process. As further assistance to rapid production, a chemical catalyst may be included so that curing of the thermosetting component continues after the shaping has been completed and the heat is no longer applied. Shaping cycles of the order of 30 seconds utilising simple and conventional heating techniques (for example it is not necessary to use high frequency or induction heating) are rendered feasible.

The invention will now be described further with reference to the following examples and to the accompanying drawing in which the single figure shows diagrammatically, and also by way of example only, an apparatus for the continuous production of particle board according to the invention.

*Example 1*

A preparation for the manufacture of particle board was made from the ingredients and in the manner now described.

The preparation consisted of a fibrous component, wood waste, thermoplastic component comprising chlorinated polyphenyl and styrene-butadiene copolymer and the thermosetting component urea formaldehyde resin with a curing catalyst. 5 parts (all parts being by weight) of chlorinated polyphenyl was prepared in emulsion form and to this was added 150 parts of styrene-butadiene latex with a solids content of 25%. This mixture was then added to 400 parts by dry weight of wood waste which had been ground to a particle size passing 5 mesh in a rotary mixer and allowed to mix for 15 minutes. Then 9 parts of a urea formaldehyde hardener or curing catalyst were added to the mix followed by 30 parts of a urea formaldehyde resin both being in powdered form. The entire preparation was then allowed to mix for 5 minutes in the rotary mixer, before being oven-dried to less than 5% moisture. The resultant preparation consisted of particles having sizes lying within the range 5 to 30 mesh. If desired it could include also long fibres of the order of half an inch in length, but if so these would need to be well layered or randomised.

The preparation may be used in the continuous production of ½ inch thick particle board on the apparatus illustrated in the single figure of the accompanying drawing.

The preparation P is first spread to thickness of approximately 2 inches on an intermittently moving endless conveyor 11 of aluminium, and carried thereby beneath an intermittently travelling endless band 12 the lower run of which is spaced from the conveyor 11 by a distance commensurate with the spread thickness stated. The conveyor 11 and the band 12 move in synchronism and carry the preparation through an oven 13, the temperature of which is 100°–120° C., where it is pre-heated. From the oven the preparation is carried to a region between the platens 14 of a press, which are both heated to a temperature of 130° C. The pressure is operated each time the conveyor 11 and band 12 are at rest so as to apply pressure and heat to the preparation between them. When the platens come together the conveyor 11 and band 12 yield to enable the pre-heated preparation to be compressed to a thickness of ⅝″. After an interval of 30 seconds the press is opened and the conveyor 11 and band 12 move on again so that the compressed hot mass is carried between the platen 15 of a further press, these platens being water-cooled so that the temperature of the mass is considerably reduced. As is shown in the drawings the platens 15 of this press are considerably wider than the platens 14. In this way "spring-back" of the mass is immediately countered by the cooling effect and consequent solidifying of the thermoplastic component and as the cooling continues the mass is converted into a solid board of uniform thickness. To ensure that the board is of uniform thickness the platens 15 further compress the mass to a thickness of ½″. If desired an additional cooling effect may be obtained by directing a flow of cold air onto the board. The intermittent movements may be as little as six inches in a small apparatus of limited output or as high as 24 inches for a large apparatus of considerable output. Waste trimmed from the edges of the board may be ground and returned for use in an appropriately small percentage in the initial mix.

*Example 2*

A fibrous moulding material was produced from waste wood, and various resins and other ingredients.

The wood waste was in the form of sawdust, shavings, chips and the like initially ground to reduce their bulk to a particle size passing 5 mesh. 17 parts of phenolic novalak resin, 5 parts of coumarone resin, 1 part of bitumen emulsion were prepared as a suspension in water with 1 part of a wetting agent and added to 75 parts by dry weight of the pre-ground wood waste in a rotary blade mixer. The total amount of water necessary to give adequate resin dispersion during mixing was 35 parts to 100 parts of the dry resin/wood mix. Thus as will be appreciated the amount of water added to the resin slurry was adjusted according to the water content of the wood waste.

The final mix was then dried to less than 5% moisture content and ground to a particle size passing 8 mesh and of the following sieve analysis.

| Mesh: | Percent |
|---|---|
| −8 +10 | 0.15 |
| −10 +30 | 45.15 |
| −30 +60 | 43.25 |
| −60 +100 | 9.20 |
| −100 +150 | 2.25 | and was found useful for the moulding of dimensionally stable and waterproof articles, such as window frames. The moulds were of a conventional nature, the moulding temperature used being within the range 120° to 180° C. and the moulding pressure being up to 2½ tons per square inch. The moulding cycle time is dependent upon thickness and required density and may vary from 2 to 5 minutes.

*Example 3*

In this example 12 parts of phenolic novalak resin, 5½ parts of lignin, 5 parts of coumarone resin and 2½ parts of ground stick shellac were mixed together and then dusted onto 75 parts of wood-waste which had been pre-ground to a particle size passing 5 mesh and mixed with sufficient water in a rotary blade mixer to bring its weight up to 100 parts. The mix was then dried to below 5% moisture content and subsequently ground to a particle size passing 8 mesh and having a sieve analysis substantially the same as the preparation of Example 2.

This preparation was found suitable for the production by moulding of articles for indoor applications, such as table tops. These were produced in moulds of conventional form (except that they had extra depth) at a moulding temperature of 120°–180° C. and a moulding pressure up to 2½ tons per square inch. The moulding cycle time would again be dependent upon thickness and required density, and may vary from 2 to 5 minutes.

The foregoing examples which it is to be understood are not intended in any way to limit the scope of the invention, nevertheless serve to emphasize its more important advantages.

Thus the production of fibre board according to Example 1 and of moulded articles according to Examples 2 and 3 are likely to be of special interest to the proprietors of timber sawing and moulding mills, and woodworkers, for the waste which is used is available in such establishments in amounts up to several hundred tons per week, and the simple type of plant which is required, could, it is believed, be installed and operated profitably in many cases. It is to be noted in this connection that the apparatus illustrated in the drawing could be used in conjunction with moulds. In this case a number of moulds are placed between the belts and the moulds are filled and struck off. A lid is placed upon the filled moulds, which lid comes into contact with the top belt as the moulds enter the hot press. As an alternative of course a conventional multi-station machine may be used for moulding. It may be arranged to have one station for filling the mould, the next for heating up the material and hot moulding and the next for cooling and ejection. It is desirable that the moulds have hollow surrounds or jackets into which heated steam or cooled air may flow according to whether the mould is to be heated or cooled.

Another advantage which is brought out clearly by Examples 2 and 3 is that waste and low-cost thermoplastic resinous materials can be used, for example stick shellac and coumarone and lignin.

The short cycle times, with corerspondingly high production, are also notable in the preceding examples.

Also worthy of note is the fact that the finished rigid articles have a modulus of elasticity very similar to wood itself.

As stated the invention is in no way limited to the particular preparations or methods of production set out in the foregoing examples. The final characteristics of the articles produced can be easily controlled by, for example, varying the nature of the fibrous material and the shaping or moulding pressure applied.

Wherever mesh sizes are referred to in this specification or the claims thereof is meant British Standard mesh.

I claim:

1. A method of producing a substantially rigid product from a preparation of substantially dry fibrous material in divided form having thermoplastic material dispersed therethrough and also having thermosetting material curable by heat, which method comprises the steps of shaping a quantity of the preparation to its desired form whilst being heated and then cooled, the heat being applied so that some curing of the thermosetting material takes place at least at the surface regions of the article before solidification of the thermoplastic material commences.

2. A method as claimed in claim 1 in which the thermoplastic material is heated to a state in which it will flow readily under modest pressure before any substantial degree of curing of the thermosetting material has taken place.

3. A method as claimed in claim 1 in which curing of the thermosetting material continues after shaping has been completed and the heat is no longer applied.

4. A method of producing particle board as claimed in claim 1 including the steps of spreading the preparation on a conveyor, moving said spread preparaton by means of the intermittent action of said conveyor and between it and an upper travelling surface successively through a pre-heating oven, between the heated platens of a press, and between the cooled platens of a further press, and operating the platens between the intermittent movements so as to shape the preparation into a rigid continuous board.

5. A method of producing articles of manufacture comprising the steps of preparing a substantially dry mixture consisting of approximately 75% by weight of natural fibrous material in divided form and, evenly dispersed therewith, a thermoplastic binder material, and a thermosetting binder material, shaping said mixture by a single simultaneous application of heat and pressure, said heat being adequate to cause said thermoplastic binder material to melt and flow, this providing a lubricant for movement of said fibrous material, and at least to initiate curing of said thermosetting binder material, and cooling said shaped mixture.

6. A method as set forth in claim 5 in which the melting point of said thermoplastic binder material is lower than the rapid curing temperature of said thermosetting binder material, whereby during heating it is enabled to flow readily under modest pressure before any substantial degree of curing of said thermosetting binder material takes place.

7. A method as set forth in claim 6 in which curing of said thermosetting binder material is completed after removal of said heat and pressure.

8. A method as set forth in claim 5 including the further steps of spreading said mixture on a conveyor, moving the spread preparation by means of intermittent action of said conveyor, between it and an upper travelling surface, successively through a preheating oven, between the heated platens of a press, and between the cooled platens of another press, and operating the platens between intermittent movements so as to shape the mixture into a rigid continuous article.

9. A method as set forth in claim 5 in which said heat and pressure is applied to said mixture whilst in a mould.

10. A method as set forth in claim 5, comprising the further step of heating the thermoplastic binder material when mixed with said fibrous material so as to cause it to become adherent thereto whilst thoroughly mixed therewith.

References Cited by the Examiner

UNITED STATES PATENTS

| | | | |
|---|---|---|---|
| 2,356,826 | 8/1944 | Coss et al. | 264—120 |
| 2,552,600 | 5/1951 | Stubblebine | 260—17.2 XR |
| 2,601,349 | 6/1952 | Welch | 264—112 XR |
| 2,758,984 | 8/1956 | Coler | 260—17.2 XR |
| 2,806,825 | 9/1957 | Wentland | 260—17.2 XR |
| 2,854,372 | 9/1958 | Yan et al. | 264—109 XR |
| 2,926,719 | 3/1960 | Matthews | 264—120 XR |
| 2,947,654 | 8/1960 | Chapman | 264—109 XR |
| 2,955,641 | 10/1960 | Burgeni | 264—123 XR |
| 3,023,136 | 2/1962 | Himmelheber et al. | 260—17.2 XR |
| 3,071,805 | 1/1963 | Merkle | 264—120 |
| 3,171,874 | 3/1965 | Rolle | 264—112 XR |
| 3,174,940 | 3/1965 | Lacoste | 264—109 XR |
| 3,233,013 | 2/1966 | Von Jaeger | 264—109 XR |

FOREIGN PATENTS

| | | |
|---|---|---|
| 553,017 | 2/1958 | Canada. |
| 646,674 | 8/1962 | Canada. |

ALEXANDER H. BRODMERKEL, *Primary Examiner.*

P. E. ANDERSON, *Assistant Examiner.*